March 24, 1970     S. GREENBERG     3,502,396

NONSTRETCH ADJUSTABLE EYEGLASS HOLDER

Filed July 24, 1968

INVENTOR.
SAMUEL GREENBERG
BY
Max R. Millman
ATTORNEY

United States Patent Office 3,502,396
Patented Mar. 24, 1970

3,502,396
NONSTRETCH ADJUSTABLE EYEGLASS HOLDER
Samuel Greenberg, Philadelphia, Pa. (Stump Road and Commerce Drive, Montgomeryville, Pa. 18936)
Continuation-in-part of application Ser. No. 736,309, June 12, 1968. This application July 24, 1968, Ser. No. 747,359
Int. Cl. G02c *3/00;* B65d *63/06;* A44b *17/00*
U.S. Cl. 351—157                2 Claims

ABSTRACT OF THE DISCLOSURE

An eyeglass holder comprised of a nonstretch adjustable strap to encircle a portion of the rear of the head whose ends can be adjustably looped about the temples so that the eyeglasses are held in place with a minimum of tension against the nose.

This invention relates to a means to engage the temples of eyeglasses and engage a portion of the rear of the head to hold the eyeglasses in place during all activities and constitutes a continuation-in-part of my copending application Ser. No. 736,309, filed June 12, 1968.

With certain individuals an elastic strap which engages a portion of the rear of the head and is attached to the temples creates discomfort by pressing against the head and, more importantly, by pulling the bridge of the frame against the nose. It is therefore the primary object of this invention to provide a nonelastic, attractive, inexpensive eyeglass holder which overcomes this disadvantage and which is adjustable both as to the size of the head and as to the thickness of the temples and whose attachment to the eyeglasses and around the rear of the head is readily and easily accomplished.

Another object of the invention is to provide an eyeglass holder of the character described in which the means to adjust the length of the strap and size of the temple-attaching loops blends in with the strap itself thereby contributing to the attractiveness of the holder.

These and other objects of the invention will become more apparent as the following description proceeds in conjunction with the accompanying drawings, wherein.

Specific reference is now made to the drawings wherein similar reference characters are used for corresponding elements throughout.

The holder is generally indicated at 10 and comprises a strap consisting of two elongated, flat, relatively thin members 12 and 14. The inner end portions 16 and 18 are rounded whereas the outer end portions 20 and 22 are preferably reduced in width. The members are provided with perforations 24 and 26 equally spaced apart throughout their length.

The strap members are relatively thin and made of suitably colored and textured materials of nonelastic quality such as polyvinyl chloride and similar plastics or fabric.

Figure 4:
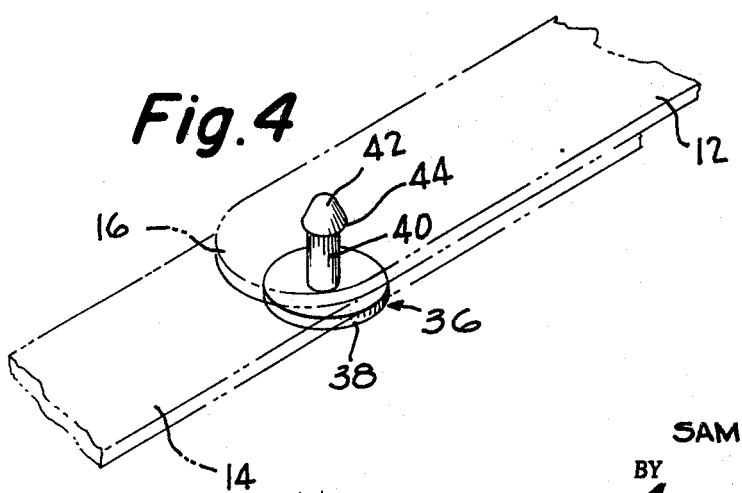
FIG. 4 is a fragmentary perspective view of the male fastening member.

The strap members are overlapped and removably attached to each other to the desired adjusted length and the ends 20 and 22 are formed into loops 28 and 30 to the desired adjusted size for engagement around the temples 32 of a pair of eyeglasses or spectacles 34. The means to effect these functions includes the perforations 24 and 26 and male members 36 of the collar button type, shown more clearly in FIG. 4. The male member 36 can be made of a variety of plastics colored and textured conformably with the strap to blend in with the appearance of the holder, and comprises a flat base member 38, a reduced shank 40 and a rounded tapered head 42 thereon slightly larger in diameter than the shank to thus form a retaining shoulder 44.

Figure 1:
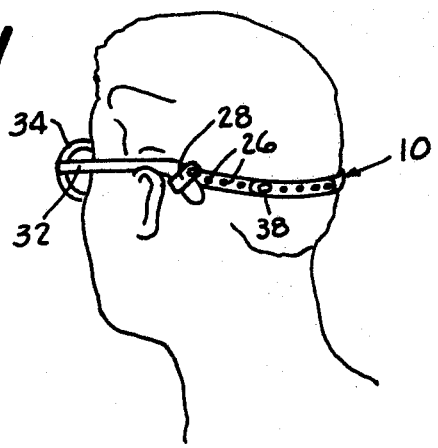
FIG. 1 is a diagrammatic perspective view of the holder shown in place around the head supporting a pair of eyeglasses or spectacles.
Figure 2:
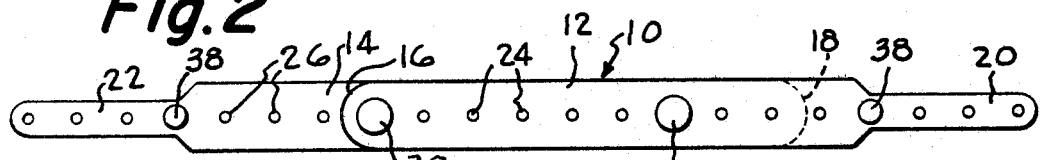
FIG. 2 is a rear elevational view of the holder in position to be attached to the temples.
Figure 3:
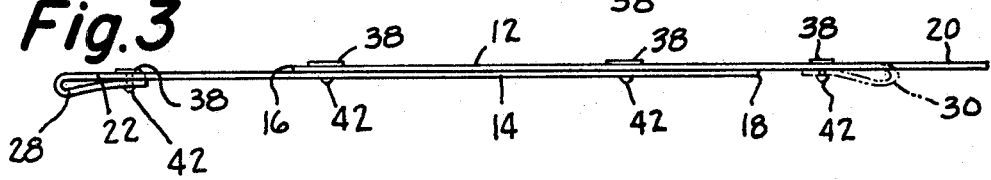
FIG. 3 is a side elevational view of the holder.

In use, four such male members 36 are provided. Three are mounted on one strap member 12 and the fourth on the other strap member 14. The male members are pushed through selected perforations so that one is mounted closely adjacent the rounded inner end 16 of the strap, another almost half way of the length of the strap and a third is mounted on the end portion 20 adjacent its juncture with the body of the strap member as seen in FIGS. 2 and 3. Similarly, the fourth male memebr 36 is pushed through a selected aperture in the end portion 22 of the other strap member 14 adjacent its juncture with the body of the strap member. All the male members are oriented in the same direction, that is with the flat bases on one side of the assembled strap and the heads 42 on the other.

The unit is now ready for adjustable assembly and mounting on the temples. The person forms the loops 28 and 30 around the temples adjacent its ends and presses the heads 42 of the male members carried by the end portions 20 and 22 into the appropriate perforations to accommodate the thickness of the temples, and making sure that the flat base portions 38 are disposed in the direction of the head. The person then places the eyeglasses on his face, reaches back to the rear of the head and overlaps the strap members 12 and 14 to the desired comfortable position and pushes the heads 42 of the other two male members 36 into the aligned overlapped perforations 26 to attach the strap members to each other in the adjusted position. This can be done while reaching back or when the spectacles and mounted strap members are off the face, whichever is easier for the wearer. In the final position, the eyeglasses are held in place comfortably and with a minimum of tension of the eyeglass frame against the nose or of the strap against the rear of the head. All of the flat bases 38 of the male members are towards the head to increase the person's comfort in wearing the holder. At the same time the holder is attractive as the male members blend in with the strap members themselves.

While preferred embodiments of the invention have here been shown and described, it will be understood that minor variations may be made without departing from the spirit of the invention.

I claim:
1. An eyeglass holder comprising a pair of elongated strap members each having an inner and outer end, said strap members having spaced perforations throughout their length, said strap members being overlapped at their inner ends, spaced male members extending removably through selected aligned perforations where the members are overlapped to retain the strap members assem- bled in a preadjusted length position for engagement around the rear of the head of a wear, male members extending through selected perforations in the outer end portions forming loops of adjusted size for engagement around the temples of a pair of eyeglasses, each male member being in the form of a button comprising a substantially flat base, a reduced shank and a tapered head on the shank somewhat wider than the shank, the bases being all disposed on one side of the assembled strap members for disposition in the direction of the head.

2. The combination of claim 1 wherein the strap members are made of a nonelastic material.

References Cited

UNITED STATES PATENTS 2,819,650  1/1958  Seron.
3,109,212  11/1963  Emery.

DAVID SCHONBERG, Primary Examiner

J. W. LEONARD, Assistant Examiner

U.S. Cl. X.R.

24—73, 206